United States Patent
Doan et al.

(10) Patent No.: US 10,780,844 B2
(45) Date of Patent: Sep. 22, 2020

(54) FASTENING SYSTEM FOR SECURING A TRIM PANEL TO A SUPPORT SUBSTRATE

(71) Applicant: FORD GLOBAL TECHNOLOGIES, LLC, Dearborn, MI (US)

(72) Inventors: Linh Ngoc Doan, Belleville, MI (US); Juergen Koehler, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 10 days.

(21) Appl. No.: 16/019,791

(22) Filed: Jun. 27, 2018

(65) Prior Publication Data

US 2020/0001802 A1 Jan. 2, 2020

(51) Int. Cl.
| | |
|---|---|
| *B60R 13/02* | (2006.01) |
| *B62D 65/14* | (2006.01) |
| *F16B 5/06* | (2006.01) |
| *F16B 2/22* | (2006.01) |
| *F16B 19/02* | (2006.01) |
| *F16B 5/10* | (2006.01) |

(52) U.S. Cl.
CPC .......... *B60R 13/0206* (2013.01); *B62D 65/14* (2013.01); *F16B 2/22* (2013.01); *F16B 5/065* (2013.01); *B60R 13/0243* (2013.01)

(58) Field of Classification Search
CPC . B60R 13/0206; B60R 13/0243; B62D 65/14; F16B 2/22; F16B 5/065; F16B 5/10; F16B 19/02
See application file for complete search history.

(56) References Cited

U.S. PATENT DOCUMENTS

| | | | |
|---|---|---|---|
| 5,169,204 A | 12/1992 | Kelman | |
| 6,196,607 B1 | 3/2001 | Gulisano | |
| 7,114,221 B2 | 10/2006 | Gibbons et al. | |
| 7,966,702 B2 | 6/2011 | Horimatsu et al. | |
| 8,677,573 B2 | 3/2014 | Lee | |
| 8,776,325 B2 * | 7/2014 | Mazur ................. | B60R 13/0206 24/297 |
| 2003/0094828 A1 * | 5/2003 | Nagamoto .......... | B60R 13/0206 296/39.1 |
| 2004/0049895 A1 * | 3/2004 | Draggoo ............. | B60R 13/0206 24/297 |
| 2004/0052575 A1 * | 3/2004 | Draggoo ............. | B60R 13/0206 403/298 |
| 2004/0052579 A1 * | 3/2004 | Draggoo ............. | B60R 13/0206 403/326 |
| 2004/0052609 A1 * | 3/2004 | Kraus .................. | B60R 13/0206 411/353 |
| 2013/0181475 A1 * | 7/2013 | Torii ..................... | B60J 5/0413 296/146.7 |
| 2014/0165362 A1 * | 6/2014 | Lee ..................... | B60R 13/0206 29/428 |

FOREIGN PATENT DOCUMENTS

JP        2010264849 A       11/2010

OTHER PUBLICATIONS

English Machine Translation of JP2010264849A.

* cited by examiner

*Primary Examiner* — Bayan Salone
(74) *Attorney, Agent, or Firm* — David Coppiellie; King & Schickli, PLLC

(57) ABSTRACT

A fastening system includes a locking pin, a doghouse, including a receiver, and a retainer body held in the receiver. The retainer body includes a retention feature adapted to receive and hold the locking pin. The fastening system is useful in a method of securing a trim component to a door inner.

17 Claims, 8 Drawing Sheets

FASTENING SYSTEM FOR SECURING A TRIM PANEL TO A SUPPORT SUBSTRATE

TECHNICAL FIELD

This document relates generally to the motor vehicle equipment field and, more particularly, to a new and improved fastening system for securing a trim panel to a support substrate and, more particularly, for securing a door trim panel to a door inner.

BACKGROUND

During a side impact collision event, vehicle lateral intrusion movement may induce severe deformation to the door sheet metal. A door trim panel attached directly to the door sheet metal via conventional mechanical fasteners such as plastic clips, pushpins, metal clips or the like may not be able to overcome the door sheet metal deformation and the door trim panel may separate away from the door sheet metal toward the occupant seating position. This separation may adversely affect vehicle level performance including, for example, proper side airbag deployment.

This document relates to a new and improved fastening system that increases the integrity of the connection between the door trim panel and the support substrate or door inner. Advantageously the enhanced integrity of this connection functions to counter side impact energy and associated vehicle lateral intrusion movement caused by side impact without performing any intensive body side structure upgrades which would, for example, require added B pillar reinforcement, thickened B pillars, door intrusion beams or the like. While effective, such body side structure upgrades do add cost as well as weight to the vehicle which adversely impacts vehicle overall fuel economy performance. Advantageously, these drawbacks are avoided by using the new and improved fastening system which is also completely hidden from view and does not detrimentally impact the aesthetic appearance of the door trim.

SUMMARY

In accordance with the purposes and benefits described herein, a new and improved trim fastening system is provided. That fastening system is particularly adapted for securing a door trim panel to a support substrate such as the door inner of a motor vehicle door.

The fastening system comprises a locking pin, a doghouse including a receiver and a retainer body held in the receiver. The retainer body includes a retention feature adapted to receive and hold the locking pin.

The retainer body may include a spring clip at a front end. The retention feature may comprise a locking aperture that receives the locking pin. That locking aperture may have a first diameter $D_1$.

The spring clip may include a first cantilever arm and a second cantilever arm. In addition the retainer body may include a stop at a rear end opposite the spring clip at the front end. When the retainer body is properly seated in the receiver of the doghouse, the spring clip may engage a first sidewall of the doghouse at a first end of the receiver and the stop may engage a second sidewall of the doghouse at a second end of the receiver.

The locking pin may include a seating flange, an anchor end on a support substrate side of the seating flange and a doghouse end on a trim component side of the seating flange. More particularly, the anchor end may include an enlarged base. The doghouse end may include a head and a shank. The shank may be provided between the head and the seating flange.

The head may have a second diameter $D_2$ wherein $D_1 > D_2$. The shank may have a third diameter $D_3$ wherein $D_1 > D_2 > D_3$. When the locking pin is properly secured in the retainer body, the shank passes through the locking aperture. In accordance with an additional aspect, a method is provided for securing a trim component to a door inner. The method comprises the steps of: (a) securing a locking pin to the door inner, (b) providing a doghouse on the trim component, (c) inserting a retainer body into a receiver in the doghouse and (d) engaging the locking pin with a retention feature of the retainer body.

The method may also include the step of sliding the retainer body in the receiver so that a shank of the locking pin engages a margin of the retainer body defining the retention feature. Still further, the method may include the step of capturing the head of the retention pin with the margin of the retainer body extending around and defining the retention feature.

Still further, the inserting step may be performed in a first direction while the sliding step may be performed in a second direction wherein the first direction is perpendicular to the second direction. The perpendicular relationship between the orientation of the inserting action and the orientation of the sliding action functions to substantially increase the integrity of the connection between the locking pin and the retainer body and thus, the integrity of the connection of the door trim panel to the door inner.

In the following description, there are shown and described several preferred embodiments of the fastening system and the related method of securing a trim panel component to a door inner. As is should be realized, the fastening system and the related method are capable of other, different embodiments and their several details are capable of modification in various, obvious aspects all without departing from the fastening system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the fastening system and the related method and together with the description serve to explain certain principles thereof.

Figure 3A:
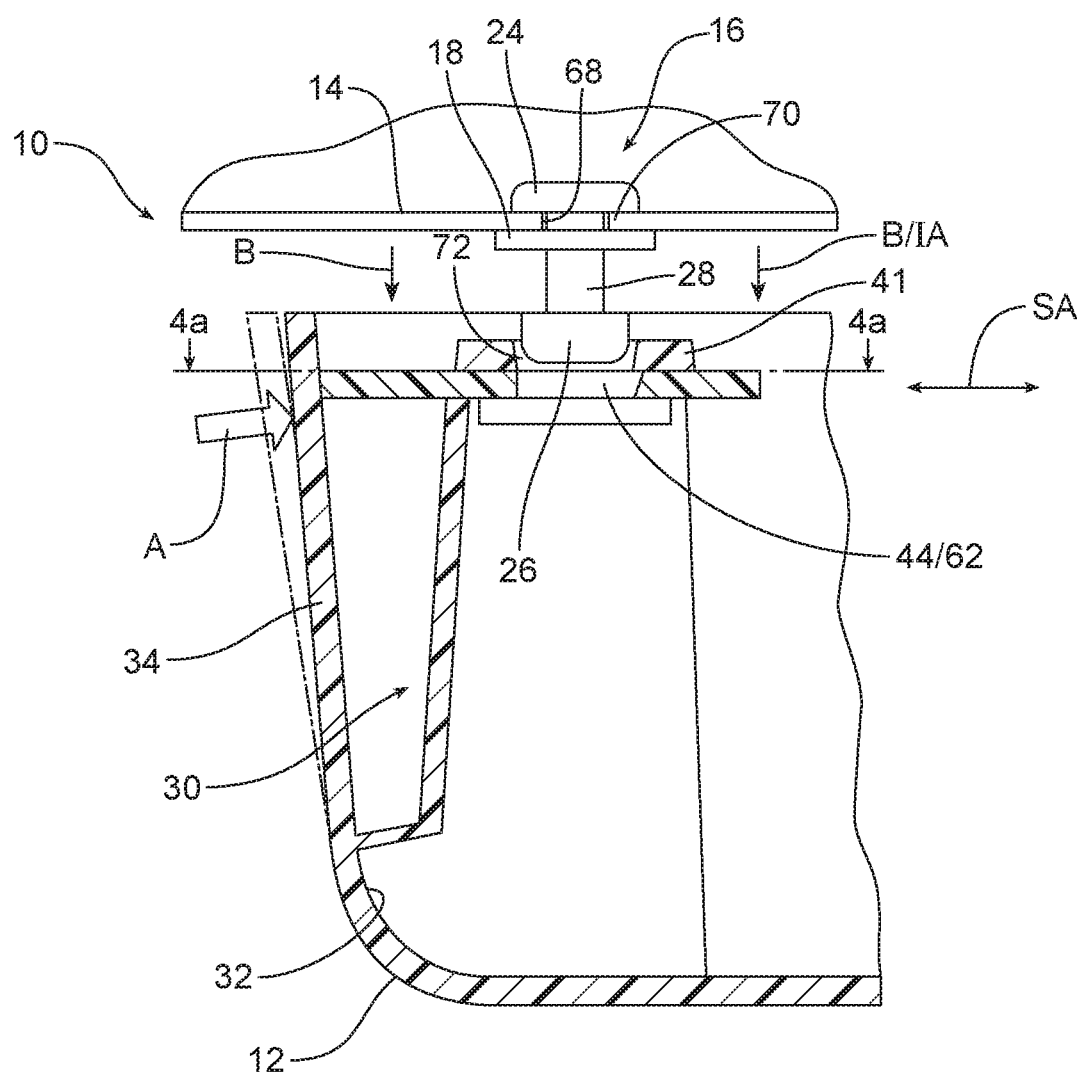
FIGS. 3a-3c are a series of views illustrating how the locking pin is fully connected to the retainer body held in a receiver of the doghouse in order to secure a door trim panel to a support substrate or door inner of a motor vehicle.
Figure 3B:
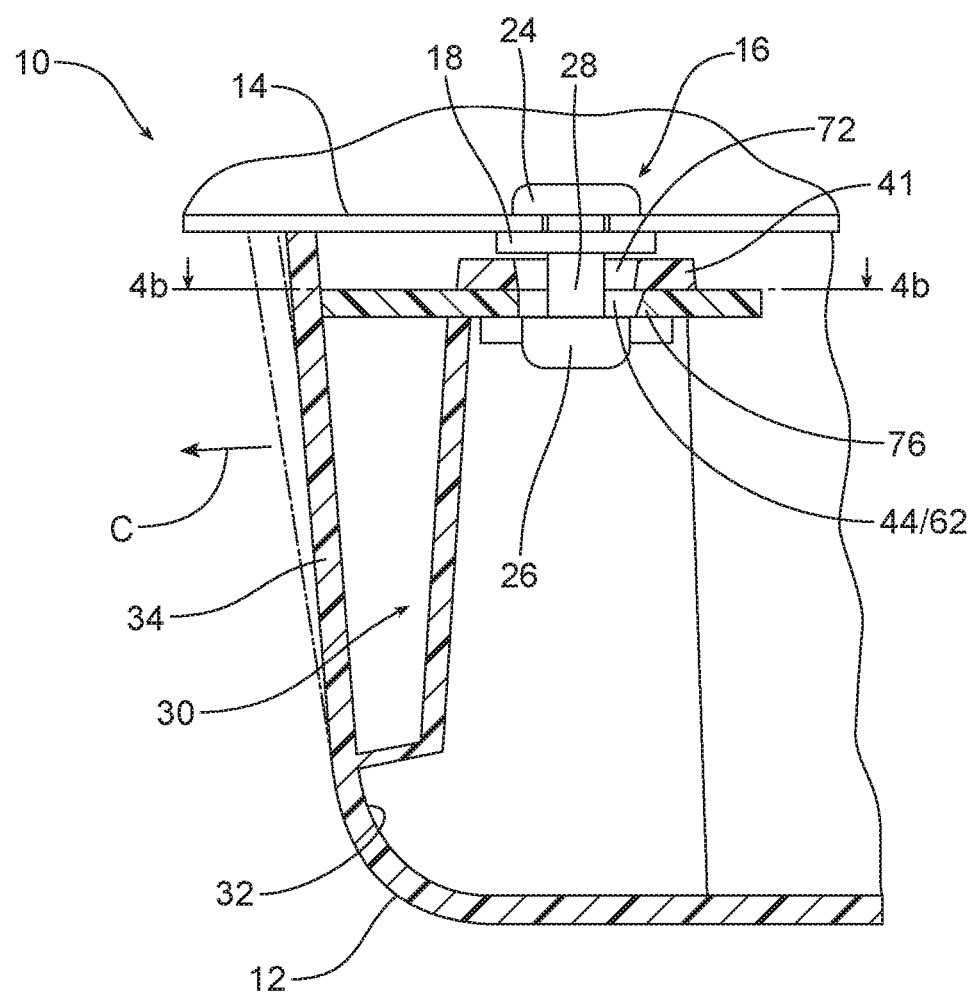
Figure 3C:
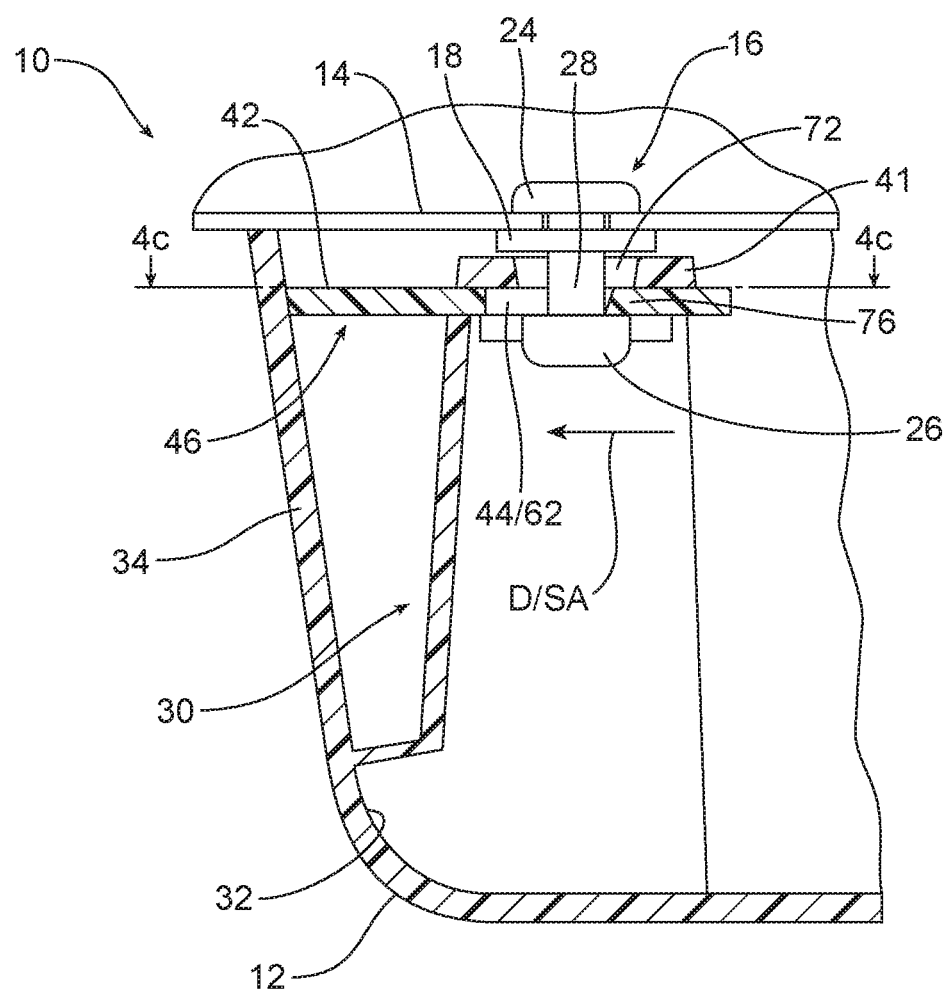

More particularly, FIG. 3a illustrates how the head of the locking pin is inserted into the first section of the locking aperture formed in the retainer body. FIG. 3b illustrates the locking pin fully inserted and seated against the doghouse with the shank of the locking pin passing through the first section of the locking aperture in the retainer body. FIG. 3c illustrates the release of pressure from the sidewall of the door trim component and the resulting sliding movement of the retainer body leading to the capture of the retention pin in the second section of the locking aperture of the retainer body.

Figure 4A:
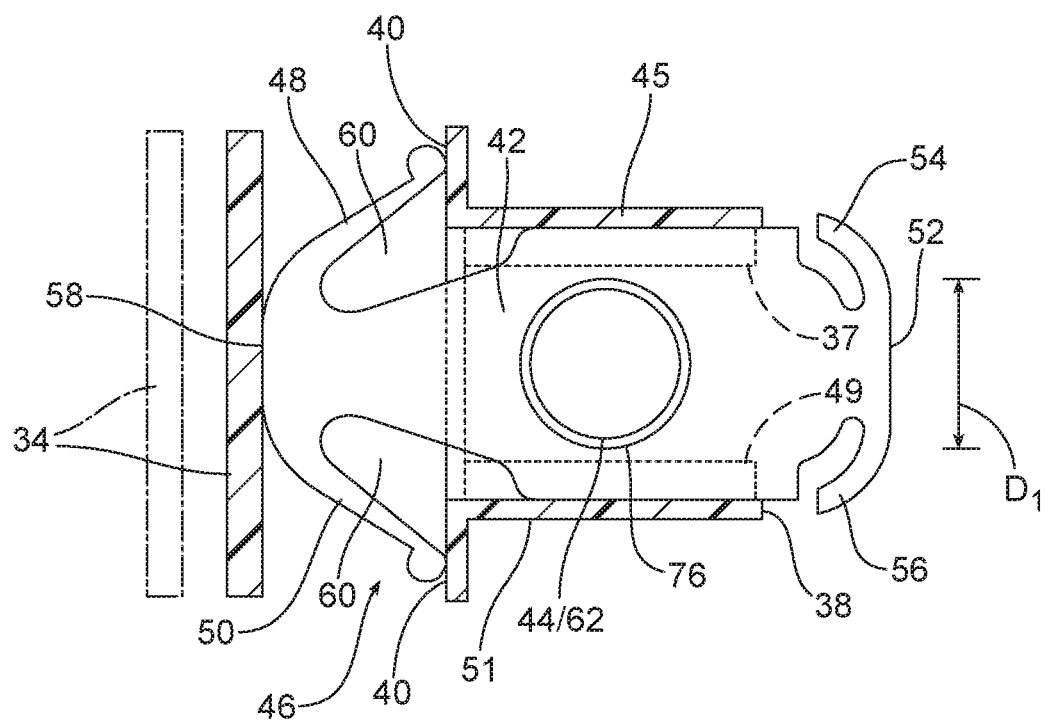
Figure 4B:
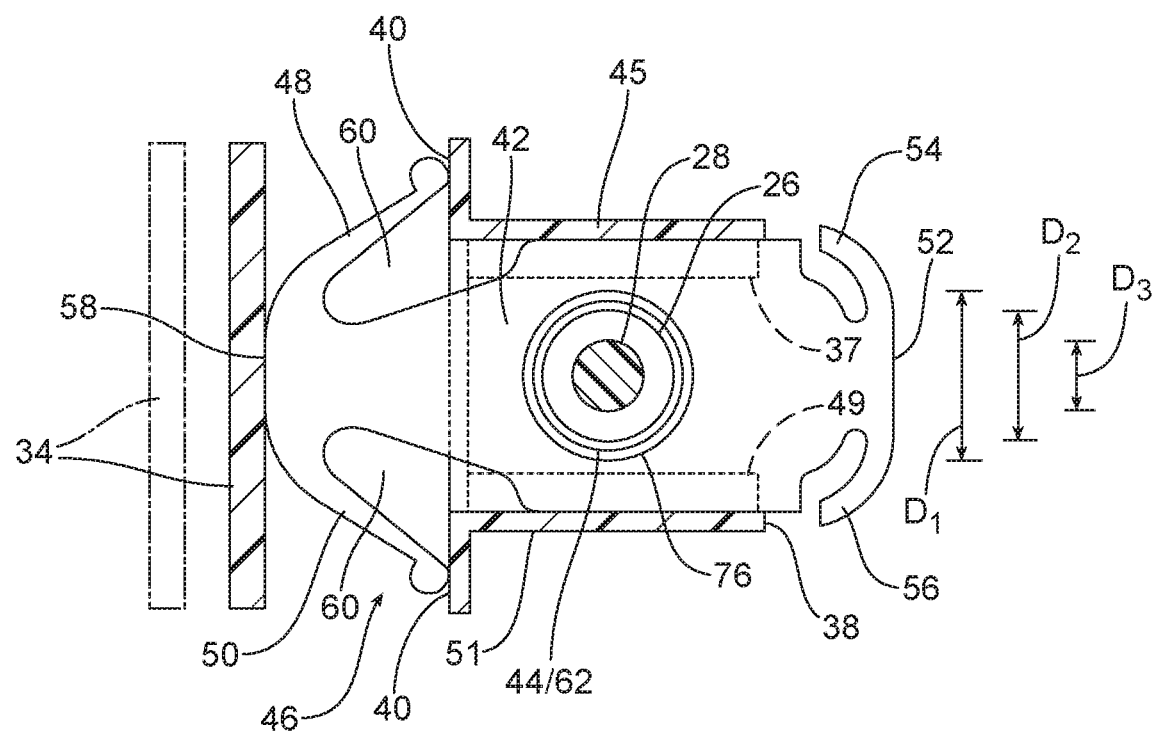
Figure 4C:
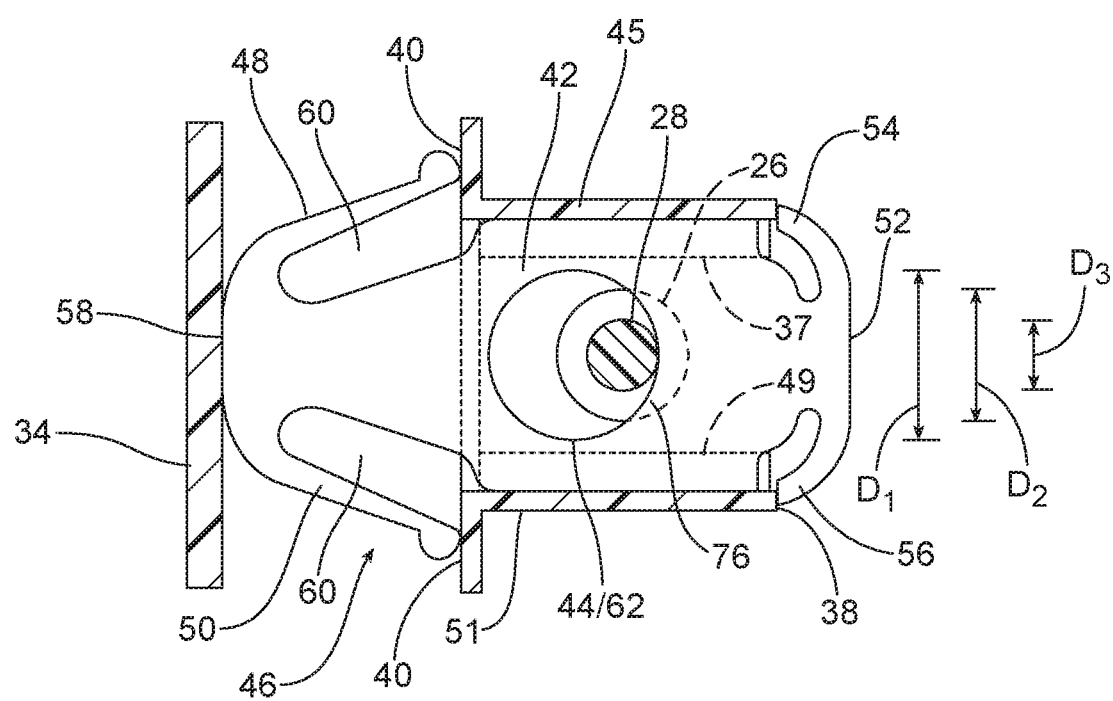

FIGS. 4a-4c are cross-sectional views taken along respective lines 4a-4a, 4b-4b and 4c-4c as illustrated in respective FIGS. 3a, 3b and 3c.

Reference will now be made in detail to the present preferred embodiments of the fastening system and related method of securing a trim component to a door inner of a motor vehicle, examples of which are illustrated in the accompanying drawing figures.

DETAILED DESCRIPTION

Reference is now made to the drawing figures illustrating the improved fastening system 10. In the illustrated embodiment, the fastening system 10 is being utilized to connect a door trim panel or component 12 to a support substrate or door inner 14 of a motor vehicle. Here it should be appreciated that the fastening system could be utilized for other applications if desired.

As illustrated in FIGS. 1 and 3a-3c, the fastening system 10 includes a locking pin 16. The locking pin 16 includes (a) a seating flange 18, (b) an anchor end, generally designated by reference numeral 20, on a support substrate side of the seating flange and (c) a doghouse end, generally designated by reference numeral 22, on a trim component side of the seating flange 18. More particularly, the anchor end 20 includes an enlarged base 24. The doghouse end 22 includes a head 26 and a shank 28. The shank 28 is situated between the head 26 and the seating flange 18.

Figure 1:
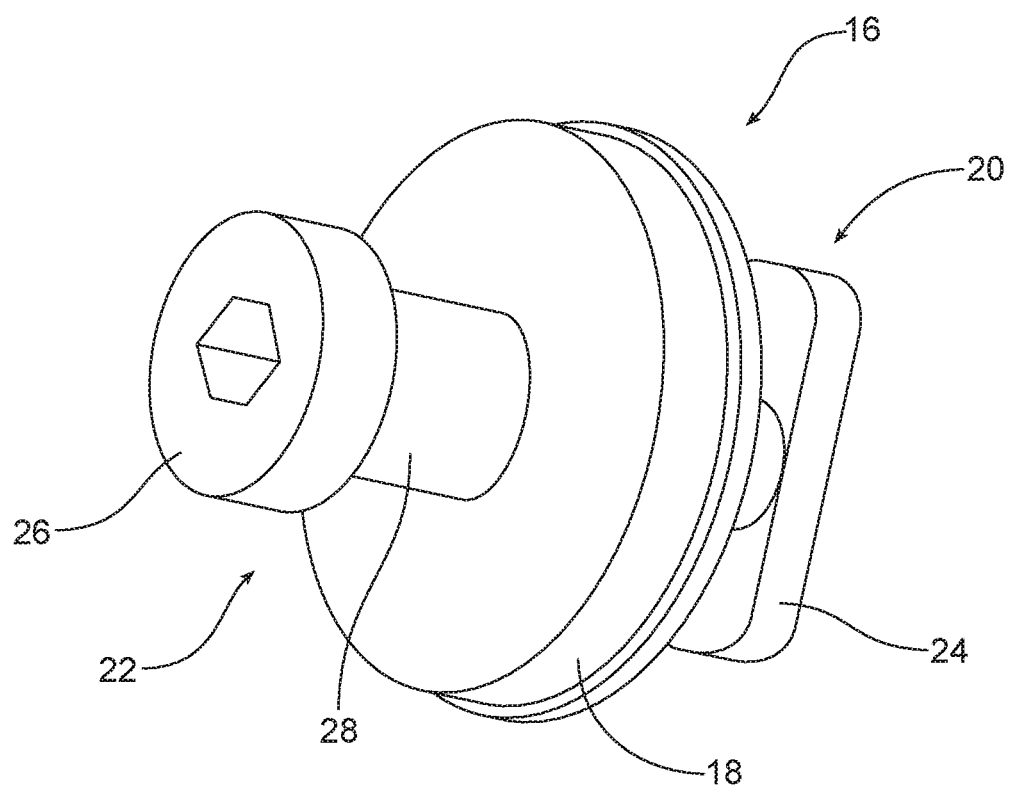
FIG. 1 is a perspective view of the locking pin of the new and improved fastening system.
Figure 2:
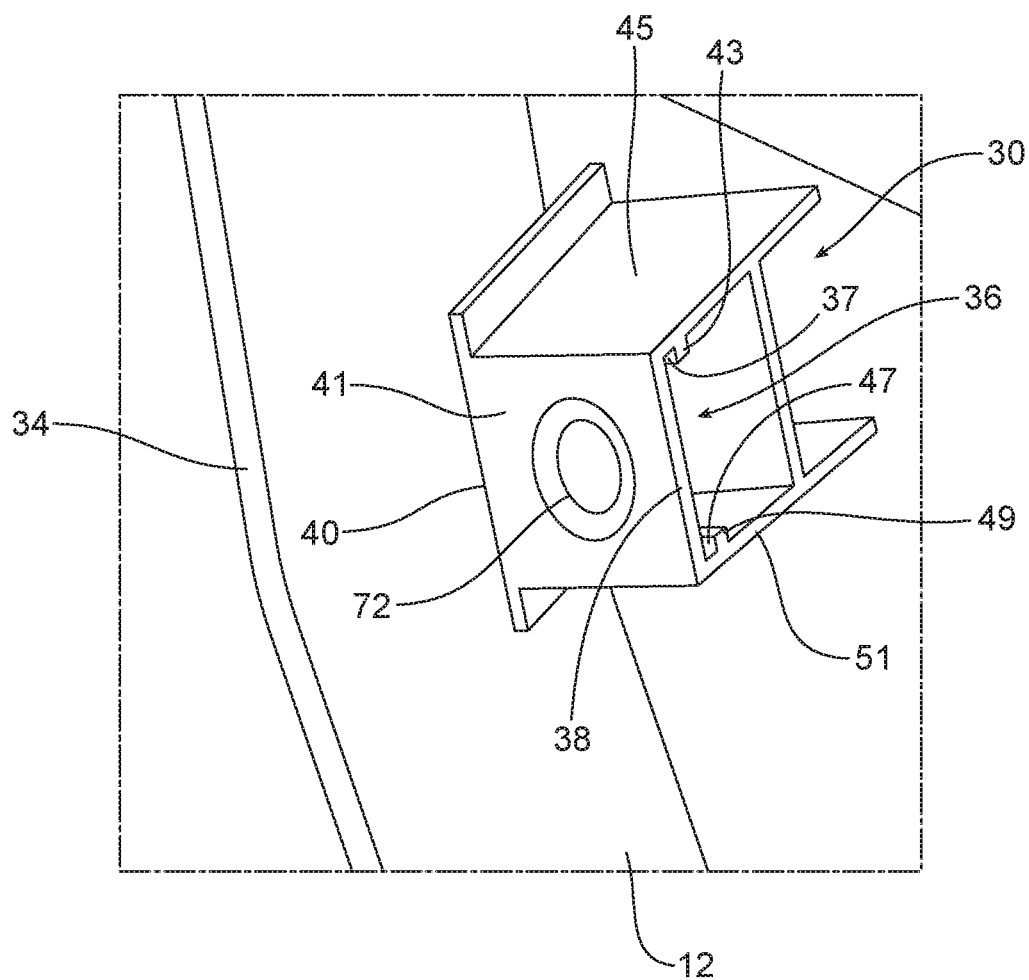
FIG. 2 is a perspective view of the doghouse of the new and improved fastening system.

As illustrated in FIG. 2, the fastening system 10 also includes a doghouse 30 that may be integrally formed on the B surface 32 of the trim component 12 adjacent the sidewall 34 of the trim component. As illustrated, the doghouse 30 includes a receiver 36 having a first channel 37 formed between the top wall 41, the rib 43 and the sidewall 45. The receiver 36 also includes a second, opposed channel 47 formed between the top wall 41, the rib 49 and the sidewall 51. See FIG. 2.

As best illustrated in FIGS. 4a-4c, the fastening system 10 also includes a retainer body 42. That retainer body 42 is held in the receiver 36 of the doghouse 30. The retainer body 42 includes a retention feature, generally designated by reference numeral 44, that is adapted to receive and hold the locking pin 16 in a manner that will be described in greater detail below.

The retainer body 42 includes an integral spring clip 46 at a front end thereof. That spring clip 46 includes a first cantilever arm 48 and a second cantilever arm 50. The retainer body 42 also includes a stop 52 at a rear end thereof. The stop 52 comprises two opposed lugs 54, 56 that are curved toward the spring clip 46.

The retainer body 42 is installed in the receiver 36 of the doghouse 30 by inserting the spring clip 46 at the front end of the retainer body into the receiver at the first end 38 and pushing the retainer body inward through the receiver. The rounded nose 58 of the spring clip 46 aids in the insertion. As the retainer body 42 is pushed through the receiver 36, the opposed first and second cantilever arms 48, 50 fold inward into the spaces 60 thereby allowing the retainer body to be fully inserted into the receiver.

When the retainer body 42 is fully and properly inserted within the receiver 36 of the doghouse 30, the lugs 54, 56 of the stop 52 engage the first end 38 of the doghouse 30. At the same time, the first and second cantilever arms 48, 50 spring back outward by resilient memory and engage the second end 40 of the doghouse. See particularly FIG. 4c.

In the illustrated embodiment, the retention feature 44 of the retainer body 42 comprises a locking aperture 62 that is adapted to receive and hold the locking pin 16. The locking aperture 62 has a first diameter $D_1$.

The head 26 of the locking pin 16 has a second diameter $D_2$ while the shank 28 of the locking pin has a third diameter $D_3$ wherein $D_1 > D_2 > D_3$. As described in greater detail below, when the locking pin 16 is properly seated within and connected to the retainer body 42 in the doghouse 30, the shank 28 of the locking pin engages the margin 76 of the retainer body 42 that defines the locking aperture 62 as shown in FIGS. 3c and 4c.

Reference will now be made to FIGS. 3a-3c and 4a-4c which illustrate a new and improved method of securing a trim component 12 to a door inner 14. That method may be broadly described as comprising the steps of securing the locking pin 16 into an aperture 68 in the door inner 14 by inserting and turning the base 24 through the aperture so that the margin 70 of the door inner 14 surrounding the aperture 68 is captured between the resilient base and the seating flange 18.

The method also includes the step of providing the doghouse 30 along the B surface 32 of the trim component 12. More particularly, the doghouse 30 may be integrally formed with the trim component 12 if desired.

In addition, the method includes the step of inserting the retainer body 42 into the receiver 36 of the doghouse 30 in the manner described above and as best shown in FIGS. 4a-4c. Still further, the method includes the step of engaging the locking pin 16 with the retention feature 44 of the retainer body 42. Toward this end, the method includes the step of inserting the head 26 of the locking pin through the locking aperture 62.

As best illustrated in FIG. 3a, this is accomplished by pushing on the sidewall 34 of the trim component 12 at the point and in the direction indicated by action arrow A in FIG. 3a until the first section 64 of the locking aperture 62 is aligned with the aperture 72 in the top wall 41 of the doghouse 30. Next, the trim component 12 is manipulated with respect to the door inner 14 to align the aperture 68 and the first section 64 of the locking aperture 62 with the head 26 of the locking pin 16 and then moved in the direction of action arrows B toward the door inner 14. Locking pin 16 can also be inserted into locking aperture 62 without simultaneously pushing sidewall 34 as hole 62 is chamfered/cone-shaped internally. When loading the door trim in the direction of action arrow Y, the head of locking pin 16, while inserting into the locking aperture 62 will slide/push the retainer body 42 sidewards until the pin head can pass 62.

Upon completion of this movement, the head 26 of the locking pin 16 has been inserted through the aperture 72 in the doghouse 30 and the locking aperture 62 so that the shank 28 passes through the middle of the locking aperture as illustrated in FIG. 3b.

The method then includes the step of sliding the retainer body 42 in the receiver 36 so that the shank 28 of the locking pin 16 engages the margin 76 of the retainer body that defines the locking aperture 62. Toward this end, one simply releases the pressure that had been applied and maintained to the sidewall 34 of the trim component 12 as illustrated at action arrow A. Upon release of this pressure, the sidewall 34 springs outward in the direction of action arrow C. At the same time, the opposed resilient cantilever arms 48, 50 of the spring clip 46 which had been pressed apart by the application of pressure on the sidewall as illustrated by action arrow A in FIGS. 3a and 3b, spring back together under resilient memory thereby causing the retainer body 42 to slide in the direction of action arrow D through the receiver 36 of the doghouse 30 until the lugs 54, 56 of the stop 52 engage the second end 40 of the doghouse 30. See FIGS. 3b, 3c, 4b and 4c.

At that point, the shank 28 of the locking pin 16 engages the margin 76 and the head 26 of the retention pin is captured by a margin of the retainer body 42 extending around and defining the locking aperture. See particularly FIGS. 3c and 4c. Here, it should be appreciated that the biasing force provided by the spring clip 46 insures that the retainer body 42 is maintained in this position, effectively locking the trim component 12 to the door inner 14 by means of engagement of the locking pin 16 with the retainer body.

As should be appreciated, the inserting action IA illustrated in FIG. 3a is in a first direction while the sliding action SA illustrated in FIG. 3c is in a second direction wherein the first direction is perpendicular to the second direction. As should be appreciated, this perpendicular orientation of these two actions ensures that the trim component 12 is connected to the door inner 14 with utmost integrity and functions to prevent separation of the trim component 12 from the door inner 14 in the event of a side impact to the motor vehicle so equipped.

As should be appreciated from viewing FIG. 3c, when the locking pin 16 is fully secured in the retention feature 44 of the retainer body 42, the fastening system 10 is completely concealed by the trim component 12. Thus, an uninterrupted aesthetically pleasing appearance is maintained.

When one desires to remove the trim component 12 from the door inner 14 for the purpose of servicing any internal door mechanism, one completes the steps described above and shown in FIGS. 3a-3c in reverse order. Thus, one depresses the sidewall 34 of the trim component 12 as shown by action arrow A in FIG. 3a in order to slide the retainer body 42 to the right in the figure and bring the locking aperture 62 into full alignment with the locking pin 16. One then pulls the trim component 12 away from the door inner 14 in a direction opposite to action arrows B in FIG. 3a. The diameter $D_1$ of the locking aperture 62 allows for the free passage of the head 26 of the locking pin 16 and the disconnection of the trim component 12 from the door inner 14.

The foregoing has been presented for purposes of illustration and description. It is not intended to be exhaustive or to limit the embodiments to the precise form disclosed. Obvious modifications and variations are possible in light of the above teachings. For example, while the fastening system has been described above as a means for securely fastening a door trim panel or component to a door inner, it should be appreciated that the fastening system could certainly be used for other applications. Further, it should be appreciated that the locking pin 16 and the retention feature 44 may assume other shapes adapted to provide the necessary locking action. Thus, for example, the locking pin 16 may assume any shape, so long as that shape includes an undercut, and the retention feature 44/locking aperture 62 may comprise any shaped aperture adapted to receive the locking pin and engage the undercut when secured in position. All such modifications and variations are within the scope of the appended claims when interpreted in accordance with the breadth to which they are fairly, legally and equitably entitled.

What is claimed:

1. A fastening system, comprising:
    a locking pin;
    a trim component including a sidewall and a doghouse, said doghouse including a receiver; and
    a retainer body held in said receiver, said retainer body including a retention feature adapted to receive and hold said locking pin, and a spring clip at a front end of the retainer body releasably captured between said sidewall and said doghouse.

2. The fastening system of claim 1, wherein said spring clip at the front end is spaced from the retention feature.

3. The fastening system of claim 2, wherein said retention feature comprises a locking aperture that receives said locking pin.

4. The fastening system of claim 3, wherein said locking aperture has a first diameter $D_1$.

5. The fastening system of claim 4, wherein said spring clip includes a first cantilever arm and a second cantilever arm.

6. The fastening system of claim 5, wherein said retainer body includes a stop at a rear end.

7. The fastening system of claim 6, wherein said stop engages a first end of said receiver.

8. The fastening system of claim 7, wherein said spring clip engages a second end of said receiver.

9. The fastening system of claim 8, wherein said locking pin includes a seating flange, an anchor end on a support substrate side of said seating flange and a doghouse end on a trim component side of said seating flange.

10. The fastening system of claim 9, wherein said anchor end includes a base.

11. The fastening system of claim 10, wherein said doghouse end includes a head and a shank wherein said shank is between said head and said seating flange.

12. The fastening system of claim 11, wherein said head has a second diameter $D_2$ wherein $D_1 > D_2$.

13. The fastening system of claim 12, wherein said shank has a third diameter $D_3$ wherein $D_1 > D_2 > D_3$.

14. A method of securing a trim component to a door inner, comprising:
    securing a locking pin to said door inner;
    providing a doghouse and a sidewall on said trim component;
    inserting a retainer body into a receiver in said doghouse;
    engaging said locking pin with a retention feature of said retainer body; and
    releasably capturing a spring clip of said retainer body between said sidewall and said doghouse.

15. The method of claim 14, including inserting a head of said locking pin through said retention feature.

16. The method of claim 15, including sliding said retainer body in said receiver so that a shank of said locking pin engages a margin of said retainer body defining said retention feature.

17. A method of securing a trim component to a door inner, comprising:
    securing a locking pin to said door inner;
    providing a doghouse on said trim component;
    inserting a retainer body into a receiver in said doghouse; and
    engaging said locking pin with a retention feature of said retainer body by inserting, in a first direction, a head of said locking pin through said retention feature, sliding, in a second direction perpendicular to said first direction, said retainer body in said receiver so that a shank of said locking pin engages a margin of said retainer body defining said retention feature and capturing said head of said locking pin with the margin of said retainer body defining said retention feature.

\* \* \* \* \*